United States Patent [19]

Loos et al.

[11] Patent Number: 4,677,962

[45] Date of Patent: Jul. 7, 1987

[54] GEARLIKE TOOL FOR DRESSING ABRASIVE, GEARLIKE, PRECISION MACHINING TOOLS

[75] Inventors: Herbert Loos, Dorfen-Stadt; Manfred Erhardt, Puchheim, both of Fed. Rep. of Germany

[73] Assignee: Carl Hurth Machinen- und Zahnradfabrik GmbH & Co., Munich, Fed. Rep. of Germany

[21] Appl. No.: 853,088

[22] Filed: Apr. 17, 1986

Related U.S. Application Data

[63] Continuation of Ser. No. 664,811, Oct. 25, 1984.

[30] Foreign Application Priority Data

Dec. 21, 1983 [DE] Fed. Rep. of Germany ....... 3346189

[51] Int. Cl.⁴ ............................................. B24B 53/06
[52] U.S. Cl. ............................. 125/11 CD; 51/206 P; 51/287
[58] Field of Search ............................ 125/39, 11 CD; 51/206 P, 206.5, 287

[56] References Cited

U.S. PATENT DOCUMENTS

| | | | |
|---|---|---|---|
| 1,633,958 | 6/1927 | Schrott | 51/206.5 |
| 1,858,568 | 5/1932 | Wildhaber | 51/287 |
| 2,334,366 | 11/1943 | Wildhaber | 51/287 |
| 2,986,856 | 6/1961 | Fehr | 51/287 |
| 3,157,174 | 11/1964 | Emery | 125/11 |
| 3,550,330 | 12/1970 | Nakamura | 51/287 |
| 3,602,209 | 7/1971 | Bocker | 51/287 |
| 4,077,164 | 3/1978 | Peterman | 51/206 P |
| 4,175,537 | 11/1979 | Wiener | 125/11 CD |
| 4,237,852 | 12/1980 | Wiener et al. | 125/11 R |
| 4,475,319 | 10/1984 | Wirz | 51/287 |

FOREIGN PATENT DOCUMENTS 2533301 2/1976 Fed. Rep. of Germany .
908885 10/1962 United Kingdom .

*Primary Examiner*—Harold D. Whitehead
*Attorney, Agent, or Firm*—Flynn Thiel Boutell & Tanis

[57] ABSTRACT

A gearlike tool for dressing abrasive, gearlike, tools used for precision machining gear workpieces has tooth flanks which are coated with diamond grains. The gaps between teeth of the base member which has the diamond coating are enlarged, for example by removing teeth, in order to make the application of the coating easier. In order to assure a fully meshing engagement, the dressing tool can be combined with uncoated guide wheels which have teeth which meshingly engage the teeth of the precision machining tool.

8 Claims, 11 Drawing Figures

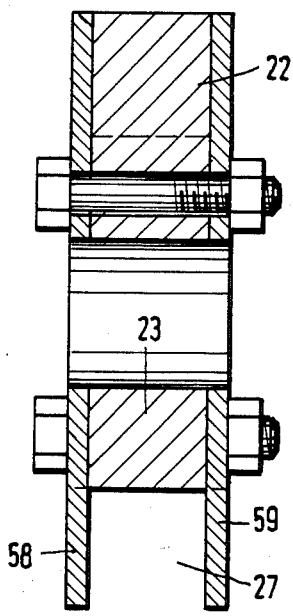
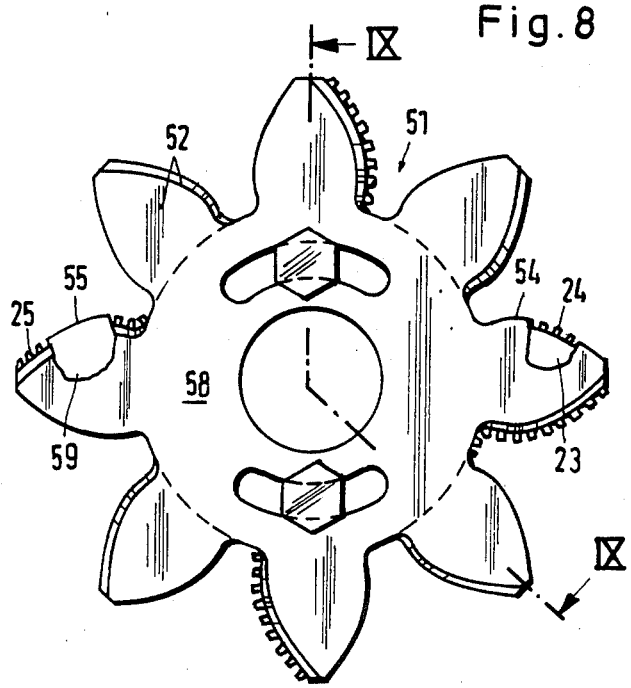
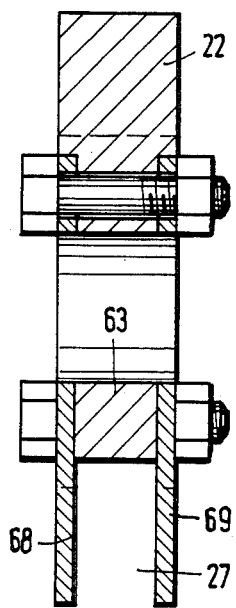
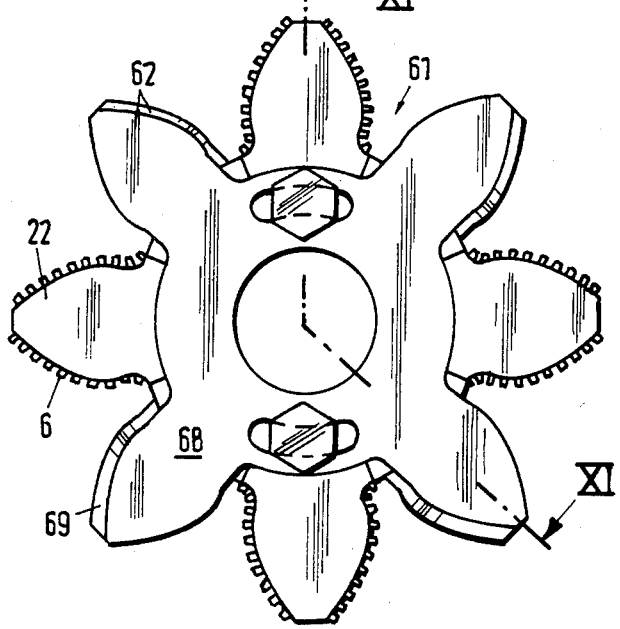

GEARLIKE TOOL FOR DRESSING ABRASIVE, GEARLIKE, PRECISION MACHINING TOOLS

This is a continuation of application Ser. No. 664,811, filed on Oct. 25, 1984.

FIELD OF THE INVENTION

The invention relates to a gearlike tool and, more particularly, to a gearlike tool having tooth flanks which are coated with hard-material grains, for example diamond grains, preferably for the purpose of dressing abrasive gearlike precision tools for machining the tooth flanks of gears, for which purpose the inventive tool is moved into meshing tooth engagement with the precision machining too. The term "gearlike" is intended to include "worm-shaped" or the like.

BACKGROUND OF THE INVENTION

Gearlike tools are known for precision machining of gears and have hard-material grains embedded in a binding agent or have a toothed metallic base member with tooth flanks which have hard-material grains embedded in a binding agent. The hard-material grains can, for example, be grains of cubic boronnitride (CBN). These known tools are exposed to a certain amount of wear during use and must be dressed from time to time in order to again obtain their original profile. The dressing tools which are used for this dressing include, as a rule, a toothed metallic base member with a coating of diamond grains which are embedded in a binding agent. The dressing tools often have dimensions substantially identical to those of the gears which are machined by the precision machining tools which are to be dressed, because with this a retooling of the machine for the dressing operation is not needed; the dressing tools are fed to the machine in place of the gears and are removed after the dressing.

Particularly in the case of tooth systems with a small modulus, producing an even coating with the diamond grains at times creates considerable difficulties, since a galvanic or other treatment in the relatively narrow gaps between teeth often yields unsatisfactory results. The cause for this is to be seen in the closely side-by-side tooth flanks on each side of each tooth gap, through which the diamond grains are deflected during the coating operation.

Due to this, a basic purpose of the invention is to provide a gearlike dressing tool of the above-mentioned type, in which the described difficulties during coating do not occur.

In addition to the attainment of this purpose, a further purpose, insofar as it is possible at the same time, is to make possible the solution to yet another problem which occurs in such dressing tools, namely, to reduce the enormous amount of time required for grinding the tooth flanks of the dressing tool. In the interest of the work result during precision machining, the precision machining tool must be true to form within small tolerances. This, however, can be achieved only with a very exact dressing tool. The dressing tools which are coated with the diamond grains must therefore be ground with a diamond grinding disk. The material thereby removed from the dressing tool per unit time is naturally very small.

SUMMARY OF THE INVENTION

For attaining the purpose of the invention, a dressing tool is provided on which the gap between two successive teeth is wider than in a comparable tool which in other respects has similar tooth system dimensions. With the widening of the tooth gaps, applying the coating with diamond grains is easier in the case of tooth systems with a small modulus, and in many cases an even coating without any problems is possible.

Pointed and also asymmetrical teeth can also be advantageous on the inventive tool. They are known in different applications, but these applications do not offer any suggestion for the invention. An asymmetrical dressing tool can sometimes be utilized only in one direction of rotation, and thus can dress both the left or right flanks of a tool only if it is turned over at some point.

Another advantageous development involves the removal of at least each second tooth. For a continuous numbering of the teeth, reference is made to removal of the teeth 2, 4, 6, 8, etc.; the teeth 2, 3, 5, 6, 8, 9, etc.; or the teeth 2, 3, 4, 6, 7, 8, 10, 11, 12, etc. When every second tooth is removed, then the tooth gaps on the dressing tool are approximately three times as wide as in the case of a comparable tool which otherwise has identical tooth system dimensions. With this, the known problems during coating no longer exist. At the same time, the time which is needed for grinding the dressing tool is reduced by approximately 50%, as is also the case in the dressing tool with asymmetrical teeth. If more teeth are removed, the grinding time is reduced even more. The extra time needed during dressing, due to the reduced number of teeth, is not particularly significant.

If, due to an odd number of teeth, in particular a prime number, no regular arrangement of the remaining teeth is possible, and it is advantageous if two of the teeth are spaced only sufficiently far apart so that on one only the left and on the other one only the right flank remains. With this, it is achieved that the number of left and right flanks on the tool is the same, which is advantageous for assuring a uniform amount of material removal from the workpiece per unit of time. In an extreme case, the dressing tool may have only one tooth, which can be manufactured as a separate part and then be inserted into a recess or groove in the base member. The last-mentioned design has the advantage that only a small part of the tool must be coated, and thus the devices needed for coating can be kept small. For holding the inserted tooth, a T-shaped, dovetail or other profile on the tooth, which profiles are known from other toothing tools, is held in a corresponding shape groove in the base member.

Certain dressing tools according to the invention can only be used on those machines in which the precision machining tool which is to be dressed is drivingly coupled in some manner with the workpiece which is to be machined by it, for example through guide wheels or an electric shaft. In order to make them also usable for machines with a simple drive effected solely by the meshing teeth of the precision machining tool and the workpiece, it is advantageous if toothed guide wheels can be mounted as narrow toothed disks next to the actual dressing tool. An arrangement for effecting rotary adjustment of the guide wheels permits the left flank of one guide wheel to be aligned with the left flank of the dressing tool and the right flank of the the dressing tool. When the base member, in the region of the removed teeth, is axially set back, the guide wheels can be designed to have only the teeth which correspond with the teeth removed from the dressing tool which, viewed in a peripheral direction, directly follow the teeth of the dressing tool. In this embodiment, the guide wheels do not need any additional axial space next to the actual dressing too, but are fully integrated therein.

BRIEF DESCRIPTION OF THE DRAWINGS

The invention will be described in detail hereinafter in connection with several exemplary embodiments which are illustrated in FIGS. 1 to 11. In the drawings:

FIGS. 8 and 9 are respectively a sectional end view and a sectional side view of a further embodiment of the dressing tool of FIG. 1 which as two guide wheels; and FIGS. 10 and 11 are sectional views similar to FIGS. 8 and 9 which illustrate yet another embodiment of the dressing tool according to FIG. 1.

DETAILED DESCRIPTION

Figure 1:
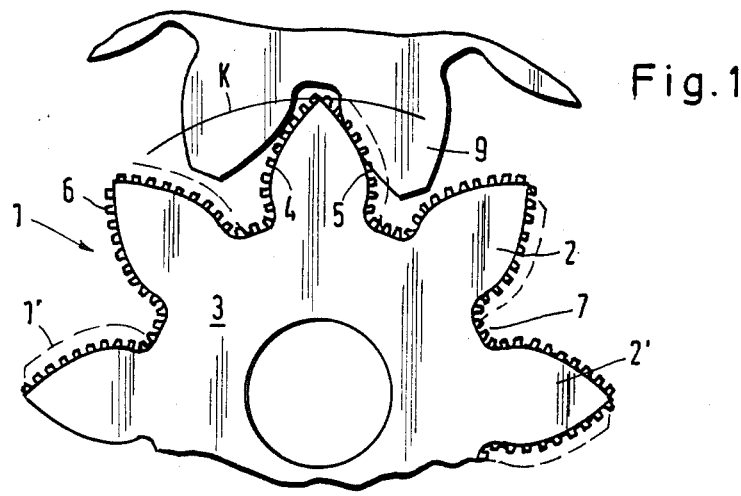
FIG. 1 is a diagrammatic side view of a conventional machining tool and of a dressing tool according to the invention, the teeth of the dressing tool having one flank moved.

In a dressing tool 1, teeth 2 and 2' on a metallic base member 3 are designed sufficiently narrow so that the left 4 and the right 5 flanks thereof meet approximately at the addendum circle K (FIG. 1). Thus, the teeth 2 and 2' are pointed teeth. A coating 6 of diamond grains can thus be applied more evenly because of the greater distance between the teeth 2 and 2', namely the wider tooth gaps 7, than in a dressing tool 1' (FIG. 1) with otherwise identical tooth system dimensions. Only some of the teeth of the precision machining tool 9 which is to be dressed with the dressing tool are illustrated.

Figure 2:
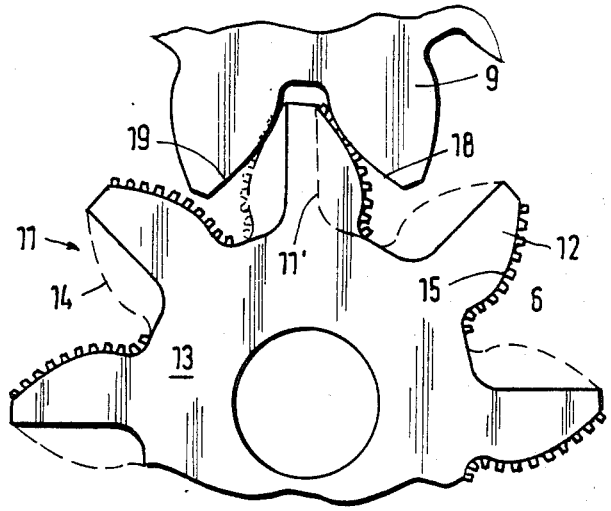
FIGS. 2, 3, 4 and 5 are views similar to FIG. 1 which respectively illustrate four alternative embodiments of the inventive dressing tool of FIG. 1.

Another way to create wider tooth gaps is illustrated in FIG. 2. Here, the left flanks 14 of all teeth 12 of a toothed metallic base member 13 are removed and only the right flanks 15 are provided with the coating 6 of diamond grains. The dressing tool 11 can thus cooperate only with the flanks 18 of the precision working tool 9 which is to be dressed. For dressing the opposite flanks 19 thereof, the dressing tool 11 must be turned over. This position is indicated by the reference numeral 11'.

Figure 3:
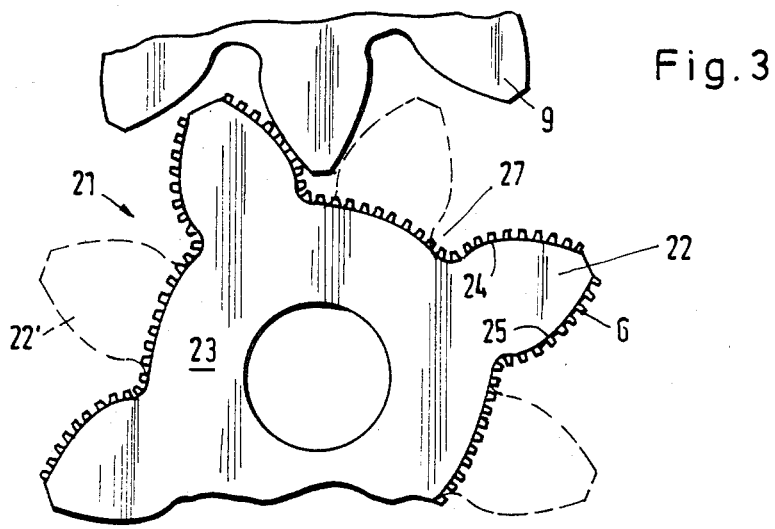

A still different way to create wider tooth gaps is shown in FIG. 3. Each second tooth 22' is removed from a toothed metallic base member 23 of a dressing tool 21. Through this, the tooth gaps 27 which are provided between the remaining teeth 22 have, compared with the normal tooth arrangement, approximately three times the normal width. The applying of the coating 6 onto the totally exposed tooth flanks 24 and 25 can here be carried out without any problem. It is also possible to remove still more teeth, so that for example only each third, fourth, etc. tooth 22 remains on the metallic base member. Through this, the time which is needed for the grinding of the diamond coating can be very substantially lowered.

Figure 4:
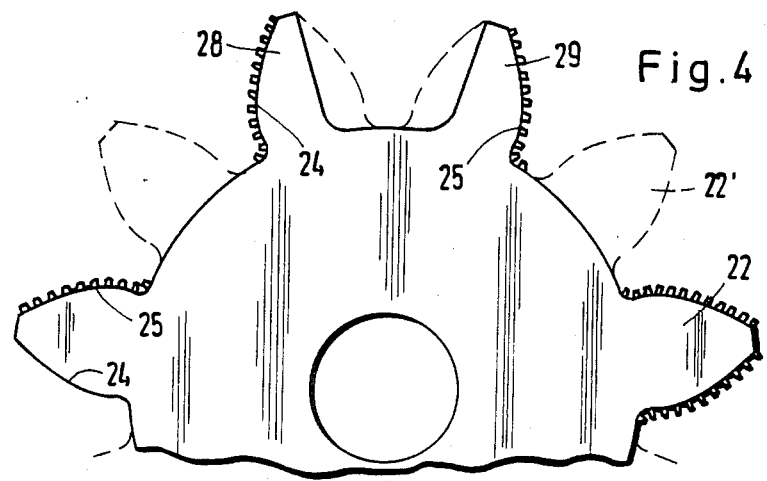

If the number of teeth does not permit an even distribution of the remaining teeth 22, it is also possible to provide two half teeth 28, 29 (FIG. 4). Namely, it is to be avoided that the dressing tool has a different number of left 24 and right 25 tooth flanks.

Figure 5:
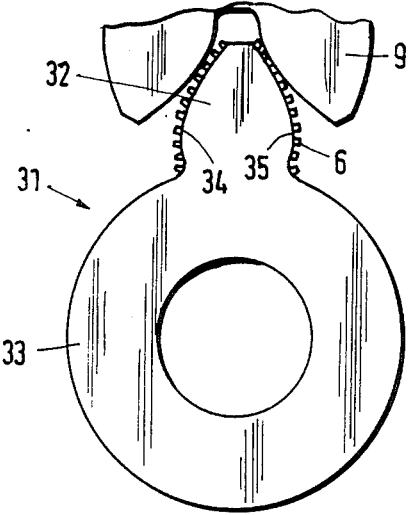

The removal of teeth can be carried until, in the extreme case, only one tooth is provided on the dressing tool. For this, FIG. 5 and FIGS. 6 and 7 respectively illustrate two examples.

A dressing tool 31 (FIG. 5) includes a metallic base member 33 which has only one tooth 32. The flanks 34 and 35 of the tooth 32 are provided with the coating 6 of diamond grains. A precision machining tool which is to be dressed is again identified with reference numeral 9.

Figure 7:
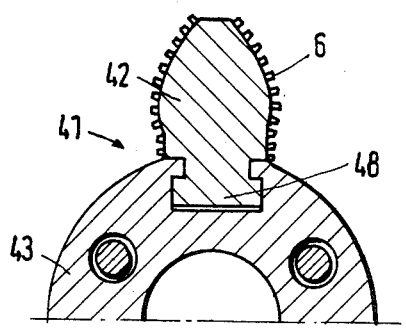
FIGS. 6 and 7 are respectively a sectional side view and a sectional end view of a further alternative embodiment of the dressing tool of FIG. 1 which has an inserted tooth.
Figure 6:
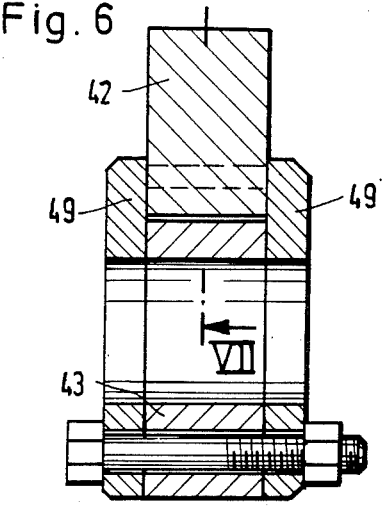

In place of the base member 33, which is only slightly complicated to manufacture and which is provided with one tooth, it is also possible, as illustrated in FIGS. 6 and 7, to secure a single separate tooth 42 (or if desired several separate teeth) on a base member 43. The fastening can occur by means of a profile on the tooth, for example a T-profile 48 or a differently shaped profile, which is received in a correspondingly formed groove in the base member 43 and is held against axial movement by lateral disks 49 removably secured to each axial end of the member 43. For coating, only the single tooth 42 must be treated, and only the side surfaces and the profile 48 thereon must be covered, while in the other above-described exemplary embodiments the entire dressing tool 1, 11, 21 or 31 will be coated unless large surface areas are covered in order to avoid applying the expensive coating on places where it is not needed. The thus-obtained dressing tool 41 can be utilized in the same manner as the aforedescribed embodiments. The dressing tools 21, 31 and 41 can, however, only be utilized on those machines in which a positive drive between the tool and workpiece spindles exists, since the removed or missing teeth prevent a meshing drive of the dressing tool by the precision machining tool being dressed.

Two exemplary embodiments are respectively shown in FIGS. 8 and 9 and FIGS. 10 and 11, which are dressing tools 51 and 61 similar to the tools 21, 31, 41 but with which a meshing drive is possible. The dressing tool 51 is similar in its design, namely, in the arrangement of its coated teeth 22, with the dressing tool 21. Additionally, axially thin toothed disks 58 and 59 are provided which can be adjusted rotationally with respect to one another and with respect to the base member 23. With this, it is possible to adjust for example the left flanks 54 of the disk 58 to be congruent with the coated flanks 25 of the base member 23. This adjustability permits greater manufacturing tolerances on the toothed disks 58 and 59 which serve as guide wheels, and furthermore permits a positional readjusting of the disks 58 and 59 when their teeth 52 have become worn as a result of rolling on the abrasive flanks of the precision machining tool which is to be dressed. The axial width of the dressing tool, which width has been increased by the thickness of the disks 58 and 59, can in some cases result in problems, namely when the guide wheels do not satisfactorily engage the gaps between the teeth of the precision machining tool which is to be dressed. In these cases, the tool 61 according to FIGS. 10 and 11 is to be preferred.

The dressing tool 61 also has a tooth arrangement similar to that of the dressing tool 21, but the base member, which is here identified with reference numeral 63, is proivded with lateral recesses, into which toothed disks 68 and 69 which serve as guide wheels are placed. The disks 68 and 69 have only those teeth 62, which correspond with the teeth 22' removed from the base member. The axially outer surfaces of the disks 68 and 69 are approximately flush with those of the teeth 22, so that the width of the dressing tool 61 is, in spite of the guide wheels, no greater than the width of the dressing tool 21.

The figures are all somewhat diagrammatic, and are primarily supposed to show as clearly as possible the important parts of the invention.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a dressing tool for dressing of abrasive gearlike precision tools, comprising a metallic, gearlike constructed base member, the tooth flanks of which are coated with extremely hard grinding grains and in which the gap between two successive teeth is wider than in a comparable gear with otherwise the same tooth system data, the improvement comprising wherein on the metallic base member from at least each second tooth, from a defined location on said metallic base member, is removed at least one of the normal left and right tooth flanks.

2. The dressing tool according to claim 1, wherein said tooth flanks of said normal teeth are involute-shaped.

3. The dressing tool according to claim 1, wherein both the left and right tooth flanks are removed so that no tooth remains.

4. A dressing tool according to claim 1, wherein said at least one of said left and right tooth flanks is removed from each tooth.

5. In a dressing tool for dressing of abrasive gearlike precision tools, comprising a metallic, gearlike constructed base member, the tooth flanks of which are located with extremely hard grinding grains and in which the gap between two successive teeth is wider than in a comparable gear with otherwise the same tooth system data, the improvement comprising wherein at least each second tooth of the metallic base member is totally removed.

6. A dressing tool according to claim 5, wherein at least one guide gear is provided and which is arranged next to the base member in axial direction and is connected angularly adjustably to same, which guide gear can also be brought into engagement with the precision working tool which is to be dressed.

7. A dressing tool according to claim 6, including an odd number of teeth on said tool prior to said removal of teeth, and wherein said guide gear has only the teeth which correspond with the teeth which are missing on the base member.

8. In a dressing tool for dressing of abrasive gearlike precision tools, comprising a metallic, gearlike constructed base member, the tooth flanks of which are coated with extremely hard grinding grains and in which the gap between two successive teeth is wider than in a comparable gear with otherwise the same tooth system data, the improvement comprising wherein at an uneven number of teeth of the metallic base member at one point of two successive teeth, only their flanks which do not face one another are coated and moreover each second tooth of the metallic base member therefrom is totally removed.

* * * * *

UNITED STATES PATENT AND TRADEMARK OFFICE
CERTIFICATE OF CORRECTION

PATENT NO.  : 4 677 962

DATED       : July 7, 1987

INVENTOR(S) : Herbert LOOS et al

It is certified that error appears in the above-identified patent and that said Letters Patent is hereby corrected as shown below:

Column 6, line 10; change "located" to ---coated---.

Signed and Sealed this

Twelfth Day of January, 1988

Attest:

DONALD J. QUIGG

Attesting Officer

Commissioner of Patents and Trademarks